United States Patent [19]

Hama et al.

[11] Patent Number: 5,003,208

[45] Date of Patent: Mar. 26, 1991

[54] MINIATURE MOTOR HAVING POSITIVE-COEFFICIENT THERMISTOR

[75] Inventors: Nobuhiro Hama; Tsutomu Saya; Sigeru Mitamura, all of Matsudo, Japan

[73] Assignee: Mabuchi Motor Co. Ltd., Chiba, Japan

[21] Appl. No.: 389,776

[22] Filed: Aug. 4, 1989

[30] Foreign Application Priority Data

Aug. 31, 1988 [JP] Japan .................. 63-114900[U]
Aug. 31, 1988 [JP] Japan .................. 63-114901[U]

[51] Int. Cl.⁵ .................................... H02K 11/00
[52] U.S. Cl. ............................ 310/68 C; 310/72; 310/154; 310/261; 318/473; 338/22 R
[58] Field of Search .............. 310/72, 40 MM, 68 C, 310/68 B, 220, 45, 221, 198, 222, 154, 248, 261, 269, 233; 318/473; 338/22 R

[56] References Cited

U.S. PATENT DOCUMENTS

| | | | |
|---|---|---|---|
| 2,910,600 | 10/1959 | Young | 310/72 |
| 3,453,513 | 7/1969 | Bates | 310/220 |
| 3,487,248 | 12/1969 | Kaneko | 310/220 |
| 3,488,538 | 1/1970 | Hayashi | 310/220 |
| 3,924,148 | 12/1975 | Tachibana | 310/220 |
| 4,126,798 | 11/1978 | Carr | 310/72 |
| 4,705,972 | 11/1987 | Baines | 310/154 |

FOREIGN PATENT DOCUMENTS

| | | | |
|---|---|---|---|
| 2802015 | 7/1979 | Fed. Rep. of Germany | 310/72 |
| 2917558 | 7/1988 | Fed. Rep. of Germany | 318/473 |
| 0120226 | 7/1986 | Japan . | |
| 0210892 | 9/1986 | Japan | 318/473 |

Primary Examiner—R. Skudy
Attorney, Agent, or Firm—McGlew & Tuttle

[57] ABSTRACT

A miniature motor having a positive temperature coefficient thermistor comprising a stator having a permanent magnet serving as a field, a rotor formed by winding a plurality of rotor windings on a rotor core, brushes supported by a motor cover plate for feeding current to the rotor windings by making contact with a commutator, positive temperature coefficient thermistor for controlling current to the rotor windings, in which the positive temperature coefficient thermistor has one pole on one pole surface thereof, and a plurality of independent split poles corresponding to the rotor windings on the other pole surface thereof, and is fitted to an end face of the rotor core;

the rotor windings being connected to the split poles of the positive-coefficient thermistor in such a manner as to be connected in series with the split poles of the positive-coefficient thermistor.

11 Claims, Print O.G. Fig 5A

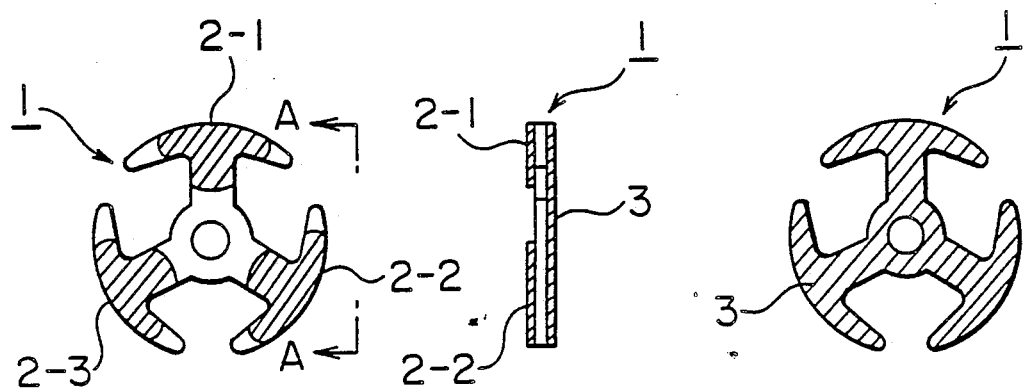
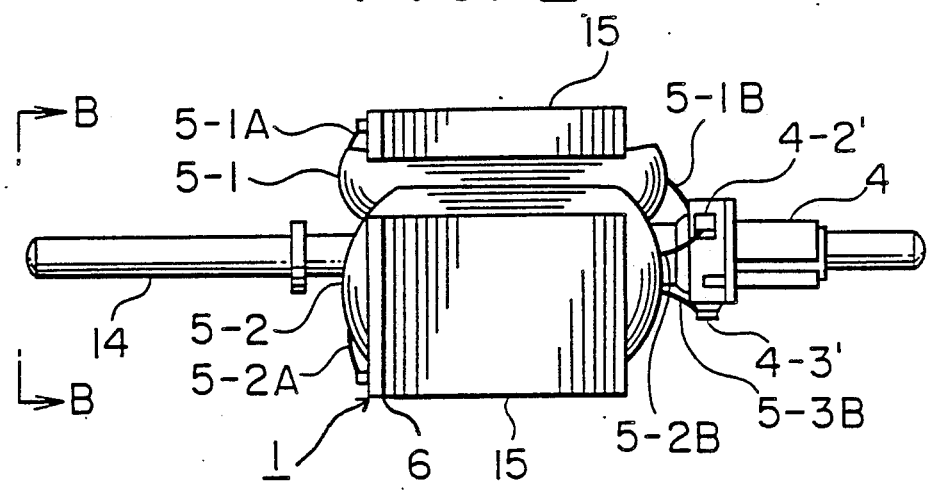
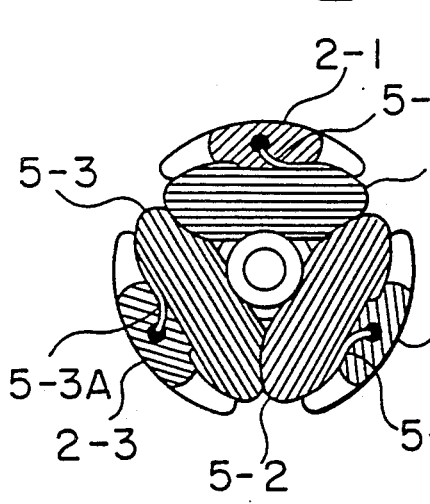
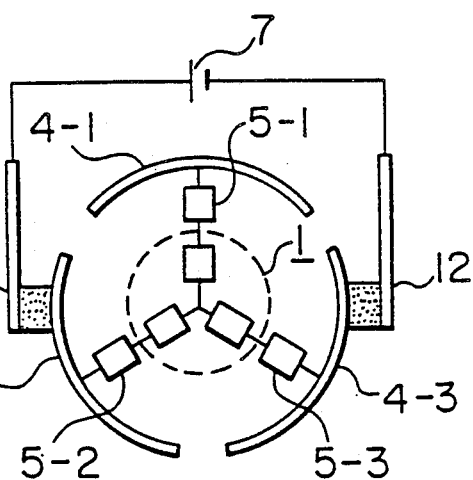

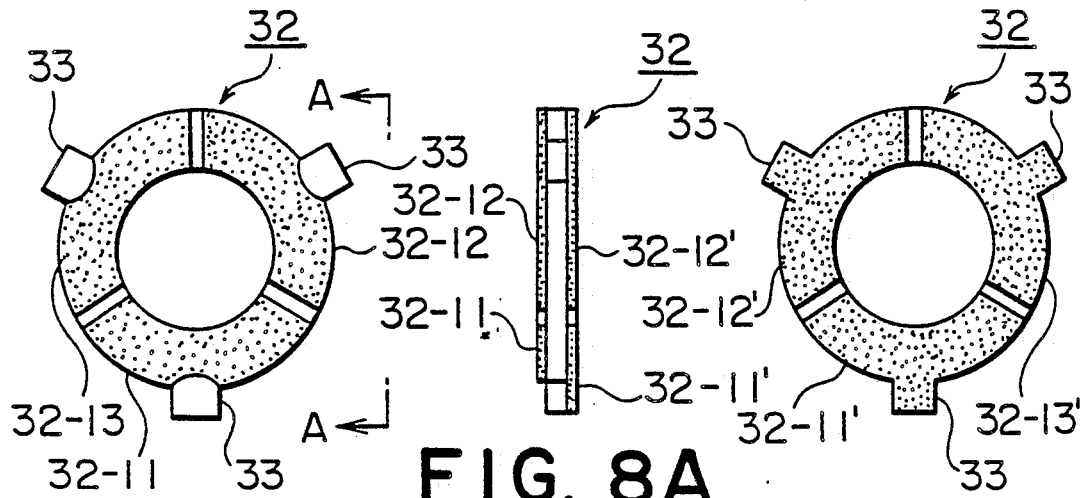
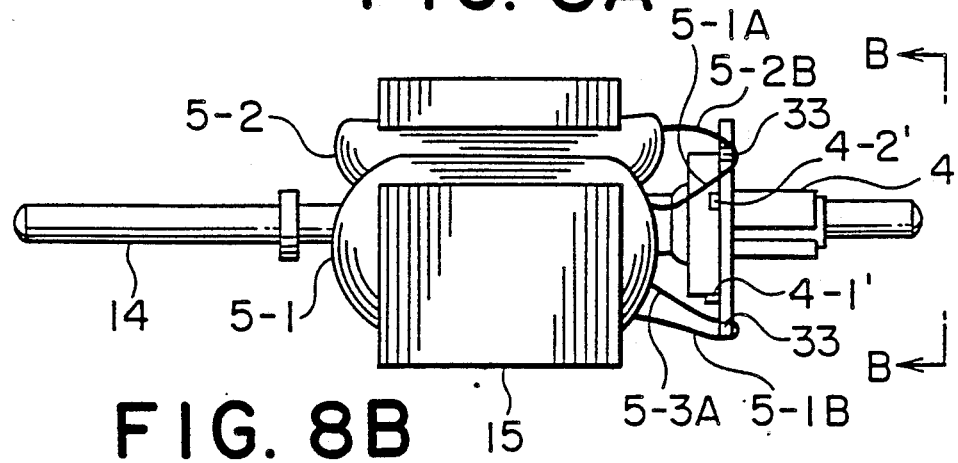
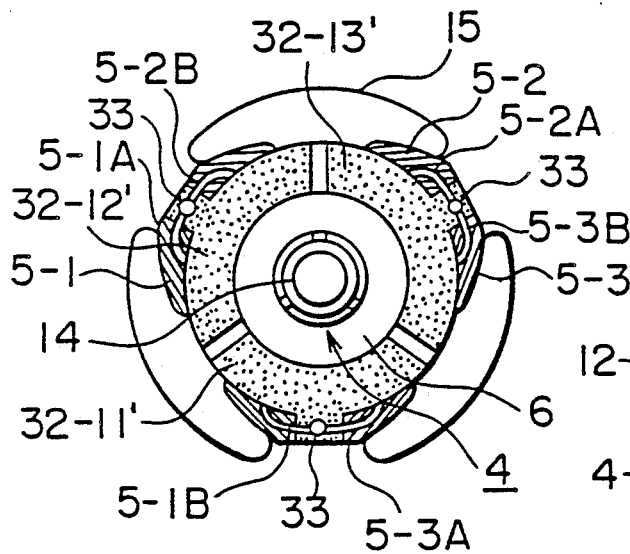
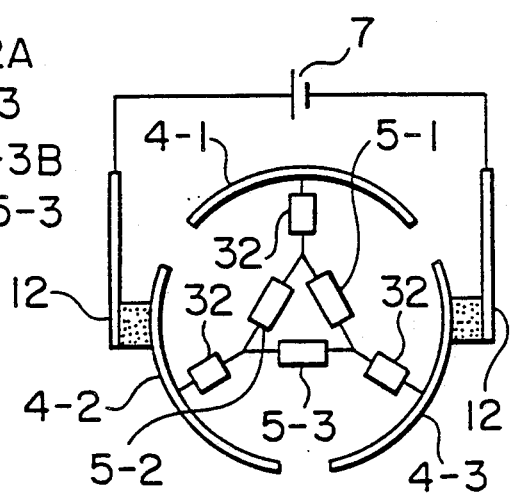

MINIATURE MOTOR HAVING POSITIVE-COEFFICIENT THERMISTOR

BACKGROUND OF THE INVENTION

This invention relates generally to a miniature motor, and more particularly to a miniature motor having a positive temperature coefficient thermistor for preventing the miniature motor from being overheated by detecting motor temperature to control overcurrent, in which the positive temperature coefficient thermistor is fitted to an end face of the rotor core, or the positive-coefficient thermistor of a ring shape is fitted to the commutator disposed around the rotor windings to enhance the response of the positive temperature coefficient thermistor, improve the overheat preventing function of the miniature motor, reduce the size of the miniature motor, and improve productivity in the manufacture of the miniature motor.

DESCRIPTION OF THE PRIOR ART

FIG. 10 is a diagram illustrating a conventional type of miniature motor upon which the present invention is based. The miniature motor shown in FIG. 10 comprises a terminal 11 supported by a motor cover plate 10, brushes 12 making contact with the commutator 4, a motor shaft 14 supported by bearings 13, a commutator 4 fixedly fitted to the motor shaft 14, a rotor core 15 fixedly fitted to the motor shaft 14 via the commutator 4; rotor windings 5 wound on the rotor core 15, and a permanent magnet 17 fixedly fitted to the inner circumferential surface of a motor case 16. When current is fed to the rotor windings 5 via the terminals 11, the brushes 12 and the commutator 4, the rotor present in the field produced by the permanent magnet 17 is caused to revolve.

The miniature motor shown in FIG. 10 has wide applications, including automotive electrical components (such as motor-driven rear-view mirrors, motor-driven windows, etc.), motor-powered toys, and tape recorders. Having a low output, the miniature motor tends to be overloaded due to a trifling trouble in the driven parts (such as rusting, entry of dirt and dust, for example), leading to the overheat or burnout of the rotor windings.

The most commonly used method of preventing the rotor windings 5 from being overheated is to cut off current in the event of overload, using a bimetal, fuse, or heat-sensitive element relay.

However, these conventional methods have various problems: (1) The bimetal method is poor in operating performance at low voltages; (2) the fuse method involves the changing of fuses when burned out; (3) the heat-sensitive element relay method results in the increased size of the circuit device.

As an overheat-preventing means that can solve these problems there is a well-known method of feeding power to a miniature motor 20 from a power source 21 via a positive temperature coefficient thermistor 19, as shown in FIG. 11. The positive temperature coefficient thermistor 19 is usually disposed in such a manner as to come into close contact with the inside of the miniature motor 20 or the surface of the motor case in order to effectively detect the temperature of the miniature motor 20.

The positive-coefficient thermistor 19 has such a characteristic that its resistance sharply increases as temperature exceeds a certain level (100° C., for example). Consequently, if a sustained overload exerted onto the miniature motor 20, or a forcible locking of motor revolution, would produce overcurrent in the rotor winding 5, causing the temperature of the miniature motor 20 to increase, this temperature rise would rapidly increase the internal resistance of the positive temperature coefficient thermistor 19, leading to a sharp decline in the current fed to the miniature motor 20 and thereby to the successful prevention of overheat of the miniature motor 20.

In the conventional type of miniature motor having the aforementioned positive temperature coefficient thermistor, the positive temperature coefficient thermistor is usually fitted to the outside or the inside of the motor in such a manner as to make close contact with the motor case.

A miniature motor having a positive temperature coefficient thermistor outside the motor requires a separate housing device, equipped with connecting terminals, etc., for housing the positive temperature coefficient thermistor. This results in an increased number of parts involved as well as in the increased manhours and cost of assembly. Installation of the thermistor outside the motor also poses an unwanted problem of a protruded profile of the motor.

A miniature motor having a positive temperature coefficient thermistor inside the motor, on the other hand, involves a space for housing the positive-coefficient thermistor. To cope with this, a motor-driven device having an overheat preventing function has been proposed in Japanese Laid-Open Utility Model Application No. 120226/1986, in which a motor case is expanded to provide a space for housing the positive-coefficient thermistor. With this construction, however, the fabrication of the motor case requires much labor, offering an unwanted structural problem of involving an additional projection.

SUMMARY OF THE INVENTION

This invention is intended to overcome the above-mentioned problems. To accomplish this, the miniature motor of this invention comprises a stator having a permanent magnet for forming a field, and a rotor having a plurality of rotor windings would on a rotor core, brushes supported by a motor cover plate for feeding current to the rotor windings by making contact with a commutator, and a positive temperature coefficient thermistor for controlling current to the rotor windings. And, in the miniature motor having a temperature coefficient thermistor for controlling current fed to the rotor windings, the positive temperature coefficient thermistor has one pole on one pole surface thereof, and a plurality of independent split poles corresponding to the rotor windings on the other pole surface therof, and is fitted to an end face of the rotor core;

the rotor windings being connected to the split poles of the positive temperature coefficient thermistor in such a manner as to be connected in series with the split poles of the positive temperature coefficient thermistor.

These and other objects and advantages of this invention will become apparent from the following description taken in conjunction with the accompanying drawings.

BRIEF DESCRIPTION OF THE DRAWINGS

FIGS. 1a, 1b and 1c are diagrams of assistance in explaining an embodiment of the positive-coefficient thermistor according to this invention; FIG. 1A being a front view, FIG. 1B a side elevation taken along line A—A in FIG. 1A, and FIG. 1C a rear view. FIGS. 2a and 2b are diagrams illustrating a rotor used in the miniature motor to which this invention has been applied; FIG. 2A being a side elevation, and FIG. 2B a side elevation taken along line B—B in FIG. 2A. FIG. 3 is a diagram of assistance explaining a power feeding circuit in this invention. FIG. 4A being a front view, FIG. 4B a side elevation taken along line A—A in FIG. 4A, and FIG. 4C a rear view. FIG. 5A being a side elevation, and FIG. 5B a side elevation taken along line B—B in FIG. 5A. FIGS. 7a, 7b and 7c are diagrams of still another embodiment of the positive-coefficient thermistor according to this invention; FIG. 7A being a front view, FIG. 7B a side elevation taken along line A—A in FIG. 7A, and FIG. 7C a rear view. FIGS. 8a and 8b are diagrams illustrating a rotor used in the miniature motor to which the embodiment shown in FIGS. 7a, 7b and 7c has been applied; FIG. 8A being a side elevation, and FIG. 8B a side elevation taken along line B—B in FIG. 8A. FIG. 9 is a diagram illustrating a power feeding circuit in the miniature motor to which the embodiment shown in FIGS. 7a, 7b and 7c has been applied.

DETAILED DESCRIPTION OF THE EMBODIMENT

Figure 10:
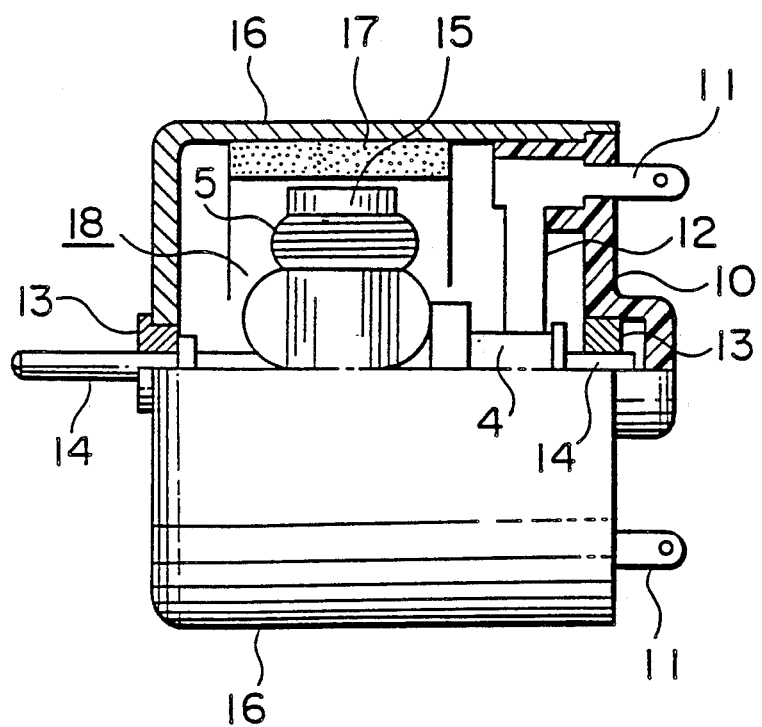
FIG. 10 is a diagram illustrating the construction of a miniature motor of the conventional type upon which this invention is based.
Figure 11:
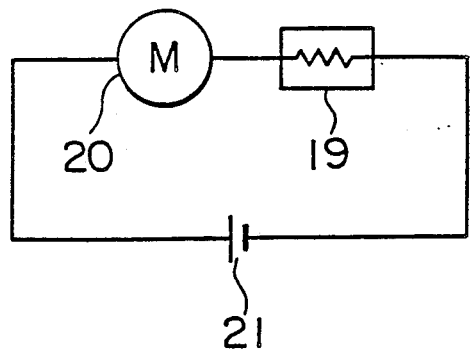
FIG. 11 is a diagram of assistance in explaining the overheat preventing function of the positive-coefficient thermistor.

In the following, an embodiment of this invention will be described, referring to FIGS. 1A, 1B, 1C, 2A, 2B and 3. in the figures, reference numeral 1 refers to a positive temperature coefficient thermistor; 2-1 through 2-3 to split poles of the positive temperature coefficient thermistor 1, formed by a tin plated part of one pole surface (herinafter referred to as Side A) of the positive temperature coefficient thermistor 1, respectively. Numeral 3 refers to a pole (hereinafter referred to as a neutral-point pole), formed by tin-plating the entire other surface or surface opposite the Side A (hereinafter referred to as Side B) of the positive temperature coefficient thermistor 1. 4-1 through 4-3 refer to commutator segments; 4-1' through 4-3' to commutator elements serving as terminals for the commutator segments 4-1 through 4-3 (the commutator element 4-1' is not shown in the figure). 5-1 through 5-3 refer to rotor windings; 5-1A through 5-3A and 5-1B through 5-3B to terminals of the rotor windings; 6 to an insulating member; and 7 to a power source respectively. Other numerals correspond with like numerals in FIG. 10.

The positive temperature coefficient thermistor 1 shown in FIGS. 1a, 1b and 1c is applied to a miniature motor having rotor windings connected in a star network, and is formed in almost the same shape as the crosssectional shape of the rotor core 15 because the positive temperature coefficient thermistor is fitted to an end face of the rotor core 15, as will be described later, referring to FIGS. 2a and 2b. On Side A of the positive-coefficient thermistor 1, there are independently formed split poles 2-1 and 2-3 corresponding to the three pieces of the rotor windings 5-1 through 5-3 (shown in FIGS. 2a and 2b, as shown in FIG. 1A. On Side B of the positive temperature coefficient thermistor 1, there is formed the neutral-point pole 3 of a shape covering the entire surface of Side B, as shown in FIG. 1C. The positive temperature coefficient thermistor 1 is fitted to an end face of the rotor core 15 via the insulating member 6, made of a synthetic resin sheet, in such a manner that the neutral-point pole 3 on Side B comes in contact with the insulating member 6, as shown in FIG. 2A. Side B positive temperature coefficient thermistor 1 comes in contact with an end face of rotor core 15 via the insulating member 6. The insulating member 6 is preferably coated on an end face of the rotor core 15. The rotor windings 5-1 through 5-3 are wound on the positive temperature coefficient thermistor 1 and the rotor core 15. Furthermore, the rotor winding terminals 5-1A through 5-3A, one ends of the rotor windings 5-1 through 5-3, are electrically connected by soldering, for example, to the split pole 2-1 through 2-3 formed on Side A of the positive temperature coefficient thermistor 1, as shown in FIG. 2B. The rotor winding terminals 5-1 through 5-3, the other terminals of the rotor windings 5-1 through 5-3 (the rotor winding 5-3 is not shown in the figure), are electrically connected to the commutator elements 4-1' through 4-3' (the commutator element 4-1' is not shown in the figure), as shown in FIG. 2A. The power feeding circuit of the miniature motor of this invention having the rotor shown in FIGS. 2a and 2b is schematically illustrated in FIG. 3. That is, the rotor windings 5-1 through 5-3 are connected in a star network via the positive temperature coefficient thermistor 1, with the result that power is fed from the power source 7 to the rotor windings 5-1 through 5-3 via the brushes 12 and 12, and the commutator elements 4-1 through 4-3.

As described above, the miniature motor having the rotor shown in FIGS. 2a and 2b has an overheat preventing function with such an excellent response as to quickly detect a temperature rise caused by overloading because the positive temperature coefficient thremistor 1 comes in contact with the rotor windings 5-1 through 5-3 and the rotor core 15. The increase in the size of the motor resulting from the installation of the positive temperature coefficient thremistor 1 can be reduced to the minimum. In addition, the ease in installing the positive temperature coefficient thermistor 1 helps improve productivity.

Next, another embodiment of this invention will be described, referring to FIGS. 4A, 4B, 4C, 5A, 5B, 6, 7A, 7B, 7C, 8A, 8B and 9. Reference numerals 31 and 32 in the figure refers to positive temperature coefficient thermistors; 31-11 through 31-13 and 32-11 through 32-13 to first split poles formed by tin-plating one side surface (hereinafter referred to as Side A, and the other side thereof referred to as Side B) of the positive temperature coefficient thermistors 31 and 32. Numeral 31-14 refers to a pole (hereinafter referred to as a neutral-point pole) formed by tin-plating the entire surface of Side B. 32-11' through 32-13' refer to second split poles formed by tin-plating Side B of the positive-coefficient thermistor 32. 33 refers to a projection provided for connecting the rotor winding. Other numerals correspond to like numerals in FIGS. 3 and 10.

Figures 4A, 4B, 4C:
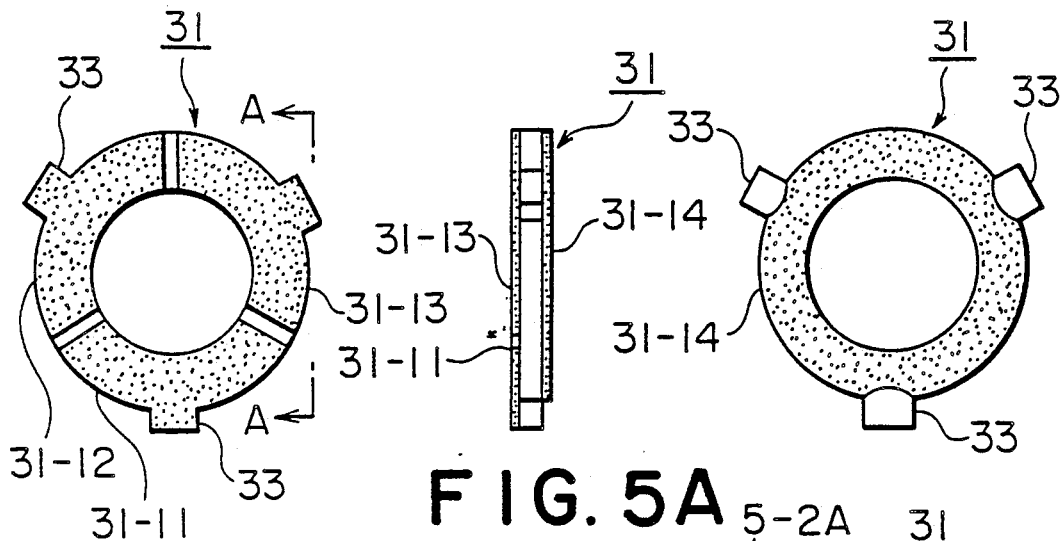
FIGS. 4a, 4b and 4c are diagrams of assistance in explaining another embodiment of the positive-coefficient thermistor according to this invention.

The positive temperature coefficient thermistor 31 in the embodiment shown in FIGS. 4a, 4b and 4c is applied to a miniature motor having rotor windings connected in a star network, and formed in a ring shape so as to be fitted to the commutator 4, as will be described later, referring to FIGS. 5a and 5b. On Side A of the positive temperature coefficient thermistor 1, independently formed are first split poles 31-11 through 31-13 corresponding to the three rotor windings 5-1 through 5-3 (shown in FIGS. 5a and 5b, as shown in FIG. 4A. On Side B of the positive temperature coefficient thermistor 31, formed is the neutral-point pole 31-14 covering the entire surface of Side B, as shown in FIG. 4C. The positive temperature coefficient thermistor 31° is fitted to the insulating member 6 which is in turn fitted to the commutator 4. The positive temperature coefficient coefficient thermistor 31 shown in FIG. 5A has Side A on the right side in the figure.

Figure 5A:
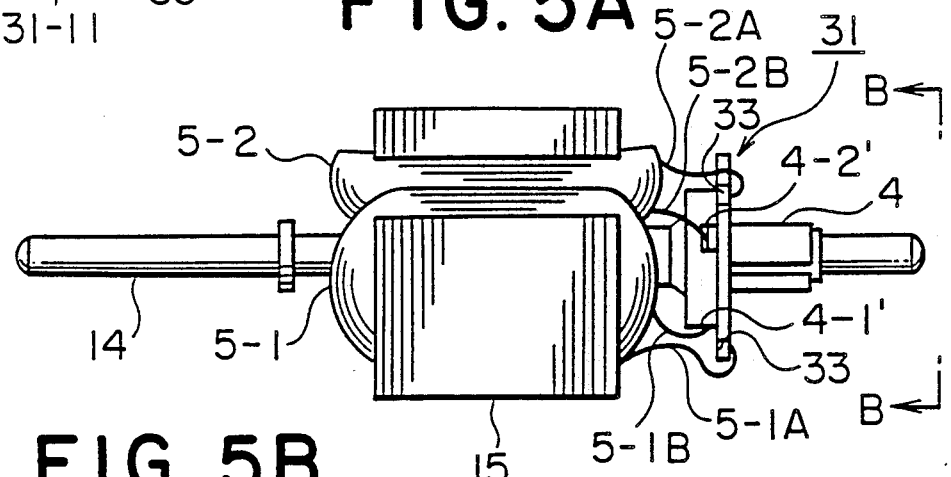
FIGS. 5a and 5b are diagrams illustrating a rotor used in the miniature motor to which the embodiment of this invention shown in FIGS. 4a, 4b and 4c has been applied.
Figure 5B:
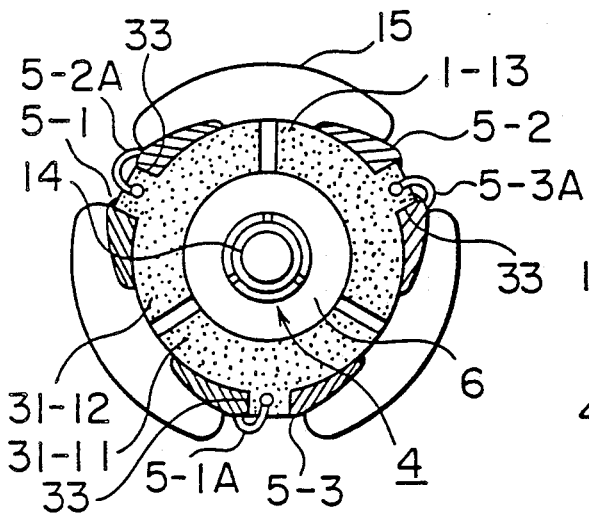

The rotor winding terminals 5-1A through 5-3A, which are one ends of the rotor windings 5-1 through 5-3, are electrically connected by soldering, for example, to the projections 33 on the first split poles 31-11 through 31-13 formed on Side A of the positive-coefficient thermistor 31, as shown in FIGS. 5A and 5B. The rotor winding terminals 5-1B through 5-3B (the rotor winding terminal 5-3B is not shown in the figure), which are the other ends of the rotor windings 5-1 through 5-3 (the rotor winding 5-3 is not shown in the figure), are electrically connected to the commutator elements 4-1' through 4-3' (the commutator element 4-3' is not shown in the figure), as shown in FIG. 5A.

Figure 6:
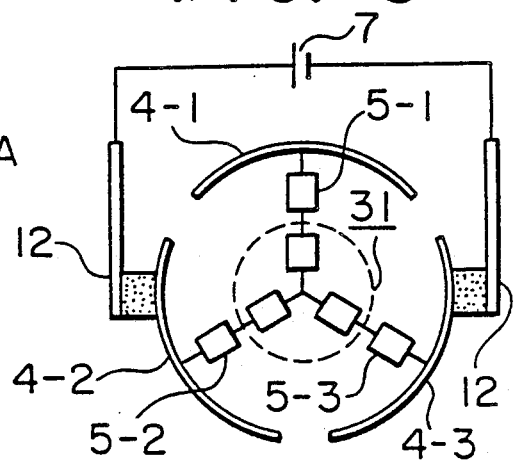
FIG. 6 is a diagram of assistance in explaining a power feeding circuit in the miniature motor to which the embodiment shown in FIGS. 4a, 4b and 4c has been applied.

The power feeding circuit in the miniature motor of this invention having the rotor shown in FIGS. 5a and 5b is schematically illustrated in FIG. 6. That is, the rotor windings 5-1 through 5-3 are connected in a star network via the positive temperature coefficient thermistor 31, with the result that power is fed from the power source 7 to the rotor windings 5-1 through 5-3 via the brushes 12 and 12 and the commutator segments 4-1 through 4-3.

The positive temperature coefficient thermistor 32 in the embodiment shown in FIGS. 7a, 7b and 7c is applied to a miniature motor having rotor windings connected in a star network, and formed in a ring shape so as to be fitted to the commutator 4, as in the embodiment shown in FIGS. 4a, 4b and 4c. On Side A of the positive temperature coefficient thermistor 32, independently formed are the first split poles 32-11 through 32-13 corresponding to the rotor windings 5-1 through 5-3 (shown in FIGS. 8a and 8b), as shown in FIG. 7A.

On Side B of the positive temperature coefficient thermistor 32, there are formed the second split poles 32-11' through 32-13' corresponding to the first split poles 32-11 through 32-13, as shown in FIG. 7C. The positive temperature coefficient thermistor 32 is fitted to the insulating member 6 which is in turn fitted to the commutator 4, as shown in FIG. 8B. The positive temperature coefficient thermistor 32 in FIG. 9 has Side B on the right side of the figure, and is fitted to the commutator 4 so that the split poles 32-11 through 32-13 on Side A come in contact with the commutator elements 4-1' through 4-3' (the commutator element 4-3' is not shown in the figure). The first split poles 32-11 through 32-13 are electrically connected by soldering, for example, to the commutator tongues 4-1' through 4-3' as shown in FIGS. 2A and 8A.

The rotor winding terminals 5-1A through 5-3A and 5-1B through 5-3B of the rotor windings 5-1 through 5-3 are electrically connected to the second split poles 32-11' through 32-13', as shown in FIGS. 8a and 8b. That is, the rotor winding terminals 5-1A and 5-2B are electrically connected by soldering to the projection 33 of the second split pole 32-12'. Similarly, the rotor winding terminals 5-2A and 5-3B are electrically connected by soldering to the projection 33 of the second split pole 32-13', and the rotor winding terminals 5-3A and 5-1B to the projection 33 of the second split pole 32-11', respectively.

The power feeding circuit in the miniature motor of this invention, having the rotor shown in FIGS. 8a and 8b is schematically illustrated in FIG. 9. That is, the rotor windings 5-1 through 5-3 connected in a star network are connected to the commutator segments 4-1 through 4-3, with the result that power is fed from the power source 7 to the rotor windings 5-1 through 5-3 via the brush 12, the commutator segments 4-1 through 4-3, and the thermistor 32.

As described above, the miniature motor of this invention having the rotor shown in FIGS. 4a, 4b and 4c or FIGS. 8a and 8b has the positive temperature coefficient coefficient thermistor 31 or 32 disposed in a position close to the rotor windings 5-1 through 5-3 not only exhibits excellent response in detecting temperature rise caused by overloading, but also is capable of reducing the increase in the size of the motor resulting from the installation of the positive temperature coefficient thermistor 31 or 32 to the minimum. Furthermore, the ease in installing the positive temperature coefficient thermistor 31 or 32 can help improve productivity in the manufacture of miniature motors.

What is claimed is:

1. A miniature motor, comprising: a stator having a permanent magnet serving as a field; a rotor formed by winding a plurality of rotor windings on a rotor core; brushes supported by a motor cover plate for feeding current to said rotor windings by making contact with a commutator, and a positive temperature coefficient thermistor for controlling current to said rotor windings, said positive temperature coefficient thermistor is formed having one side with one pole forming one surface thereof, and having another side with a plurality of independent split poles, corresponding to said rotor windings, forming another surface thereof, said positive temperature coefficient being fitted to an end face of said rotor core, said rotor winding being connected to said split poles of said positive temperature coefficient thermistor in such a manner as to be connected in series with said split poles of said positive temperature coefficient thermistor.

2. A miniature motor as set forth in claim (1) wherein said positive temperature coefficient thermistor has the same shape as said rotor core.

3. A miniature motor as set forth in claim (1) wherein there is an insulating material between said positive-coefficient thermistor and said rotor core.

4. A miniature motor as set forth in claim (1) wherein said rotor windings are wound on said positive temperature coefficient thermistor and said rotor.

5. A miniature motor as set forth in claim (1) wherein one set of ends of said rotor windings is connected to said commutator, and another set of ends of said rotor windings is connected to said split poles of said positive-coefficient thermistor.

6. A miniature motor comprising: a stator having a permanent magnet serving as a field; a rotor formed by winding a plurality of rotor windings on a rotor core; brushes supported by a motor cover plate for feeding current to said rotor windings by making contacts with a commutator; and a positive temperature coefficient thermistor for controlling current to said rotor windings, said positive temperature coefficient thermistor is formed into a ring shape having one side with a surface and an opposite side with another surface a plurality of independent split poles corresponding to said rotor windings being formed on said surface of said positive temperature coefficient thermistor and one pole being formed on said another surface thereof, and said positive temperature coefficient thermistor is disposed on said commutator via an insulating member, said rotor winding being connected to said split poles of said positive termperature cofficient thermistor in such a manner as to be connected in series to said positive temperature coefficient thermistor.

7. A miniature motor as set forth in claim (6) wherein said positive termperature coefficient thermistor has projections extending in a circumferential direction thereof.

8. A miniature motor as set forth in claim (6) wherein one set of ends of said rotor windings is connected to said commutator, and other set of ends thereof is connected to said projections.

9. A miniature motor, comprising: a stator having a permanent magnet serving as a field; a rotor forme by winding a plurality of rotor windings on rotor core; brushes supported by a motor cover plate for feeding current to said rotor windings by making contact with a commutator; and a positive temperature coefficient thermistor for controlling current to said rotor windings, said positive temperature coefficient thermistor having a first side with a surface having a plurality of first split poles independently formed thereon in such a manner as to correspond to said rotor windings, and a plurality of second split poles independently formed on a surface of another side of said positive temperature coefficient thermistor in such a manner as to correspond to said first split poles, and said positive temperature coefficient thermistor is disposed on said commutator via an insulating member; said rotor windings being connected to said first and second split poles of said positive-coefficient thermistor in such a manner as to be connected in series to said positive temperature coefficient thermistor.

10. A miniature motor as set forth in claim (9) wherein said positive temperature coefficient thermistor has projections extending in a circumferential direction thereof.

11. A miniature motor as set forth in claim (9) wherein said first split poles are connected to said commutator, and said second split poles are connected to said rotor windings which are adjacent to each other.

* * * * *